United States Patent
Shidla et al.

(10) Patent No.: US 7,206,969 B2
(45) Date of Patent: Apr. 17, 2007

(54) OPPORTUNISTIC PATTERN-BASED CPU FUNCTIONAL TESTING

(75) Inventors: Dale John Shidla, Roseville, CA (US); Andrew Harvey Barr, Roseville, CA (US); Ken Gary Pomaranski, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 555 days.

(21) Appl. No.: 10/658,981

(22) Filed: Sep. 10, 2003

(65) Prior Publication Data

US 2005/0055674 A1   Mar. 10, 2005

(51) Int. Cl.
   *G06F 11/00*   (2006.01)
(52) U.S. Cl. .......................... 714/30; 707/140
(58) Field of Classification Search .................. 714/30, 714/37
   See application file for complete search history.

(56) References Cited

U.S. PATENT DOCUMENTS

| | | | | |
|---|---|---|---|---|
| 4,916,696 A | * | 4/1990 | Funakubo | 714/11 |
| 5,195,101 A | * | 3/1993 | Guenthner et al. | 714/49 |
| 5,202,975 A | * | 4/1993 | Rasbold et al. | 717/151 |
| 5,396,618 A | * | 3/1995 | Fukui et al. | 714/30 |
| 5,530,804 A | * | 6/1996 | Edgington et al. | 714/30 |
| 5,640,508 A | * | 6/1997 | Fujiwara et al. | 714/30 |
| 5,732,209 A | * | 3/1998 | Vigil et al. | 714/30 |
| 5,819,088 A | * | 10/1998 | Reinders | 717/149 |
| 5,835,776 A | * | 11/1998 | Tirumalai et al. | 717/161 |
| 5,838,692 A | * | 11/1998 | Tobin | 714/724 |
| 5,838,897 A | * | 11/1998 | Bluhm et al. | 714/30 |
| 6,134,675 A | * | 10/2000 | Raina | 714/37 |
| 6,260,190 B1 | | 7/2001 | Ju | |
| 6,289,300 B1 | * | 9/2001 | Brannick et al. | 703/28 |
| 6,385,755 B1 | * | 5/2002 | Shimomura et al. | 714/819 |
| 6,408,377 B2 | * | 6/2002 | Munson | 712/215 |
| 6,434,712 B1 | * | 8/2002 | Urban et al. | 714/12 |
| 6,553,530 B1 | * | 4/2003 | Kim | 714/738 |
| 6,625,688 B1 | * | 9/2003 | Fruehling et al. | 711/109 |
| 6,640,313 B1 | * | 10/2003 | Quach | 714/10 |
| 2002/0038418 A1 | * | 3/2002 | Shimamura | 712/245 |
| 2004/0039967 A1 | * | 2/2004 | Park | 714/30 |
| 2005/0055608 A1 | * | 3/2005 | Shidla et al. | 714/25 |

(Continued)

FOREIGN PATENT DOCUMENTS

EP    0 141 744 A2    5/1985

(Continued)

OTHER PUBLICATIONS

W. Hahn, et al. "Pseudoduplication of Floating-Point Addition-A method of Compiler Generated Checking of Permanent Hardware Faults", 1991, pp. 161-165, VLSI Test Symposium.

(Continued)

*Primary Examiner*—Scott Baderman
*Assistant Examiner*—Brian Assessor

(57) ABSTRACT

One embodiment disclosed relates to a method of compiling a program to be executed on a target microprocessor. A cycle is identified during which a functional unit would otherwise be idle. A diagnostic operation is opportunistically scheduled for execution on the functional unit during that cycle, and a comparison is scheduled to compare a result from executing the diagnostic operation with a corresponding predetermined result.

13 Claims, 7 Drawing Sheets

U.S. PATENT DOCUMENTS

2005/0055674 A1* 3/2005 Shidla et al. ............... 717/131
2005/0055683 A1* 3/2005 Shidla et al. ............... 717/161

FOREIGN PATENT DOCUMENTS

EP  0 924 603 A2  6/1999
GB  1 247 746 A   9/1971
JP  60-065348 A   4/1985

OTHER PUBLICATIONS

Patents Act 1977: Search Report under Section 17 for Application No. GB 0 418 638.3.

* cited by examiner

OPPORTUNISTIC PATTERN-BASED CPU FUNCTIONAL TESTING

BACKGROUND OF THE INVENTION

1. Field of the Invention

The present invention relates generally to computer systems. More particularly, the present invention relates to microprocessors and compilers.

2. Description of the Background Art

One conventional solution for providing fault tolerance in digital processing by central processing units (CPUs) involves a computer system with multiple CPUs. For example, the multiple CPUs may be operated in full lockstep to achieve a level of fault-tolerance in their computations. Such a solution is expensive in that it disadvantageously requires additional system hardware and support infrastructure.

Another conventional solution for providing fault tolerance in digital processing by central processing units (CPUs) involves the use of software verification. The software verification may be performed either by executing the program multiple times on the same computer or on different computers. However, this solution is expensive in that it disadvantageously requires a longer run-time or requires multiple computers.

The above-discussed conventional solutions are expensive in terms of cost and/or system performance. Hence, improvements in systems and methods for providing fault tolerant digital processing by CPUs are highly desirable.

SUMMARY

One embodiment of the invention pertains to a method of compiling a program to be executed on a target microprocessor. A cycle is identified during which a functional unit would otherwise be idle. A diagnostic operation is opportunistically scheduled for execution on the functional unit during that cycle, and a comparison is scheduled to compare a result from executing the diagnostic operation with a corresponding predetermined result.

Another embodiment of the invention relates to a program compiler for a target microprocessor. The compiler includes a code generator with a scheduler. The scheduler identifies a cycle during which a functional unit would otherwise be idle. A known operation is then opportunistically scheduled to be executed on the functional unit during that cycle, and a comparison is scheduled to compare a result from executing the known operation with a corresponding known result.

Another embodiment of the invention relates to a computer-readable program product for execution on a target microprocessor. The executable code of the program product includes a known operation scheduled for a functional unit that would otherwise be idle during a cycle and also includes a subsequently scheduled comparison of a result from executing the known operation with a corresponding known result.

DETAILED DESCRIPTION

As discussed above, prior systems and methods for fault-tolerant digital processing by CPUs have various disadvantages. The present invention relates to systems and methods for improving the reliability of computations performed by a CPU.

As more and more transistors are put on integrated circuits with smaller and smaller feature sizes and lower voltage levels, the need for on-chip fault tolerance features is increased. Typically, error correction coding may be used to detect and correct errors. Unfortunately, it is difficult to fully apply error correction coding for CPU execution units such as arithmetic logic units (ALUs) and floating point units (FPUs).

Figure 1:
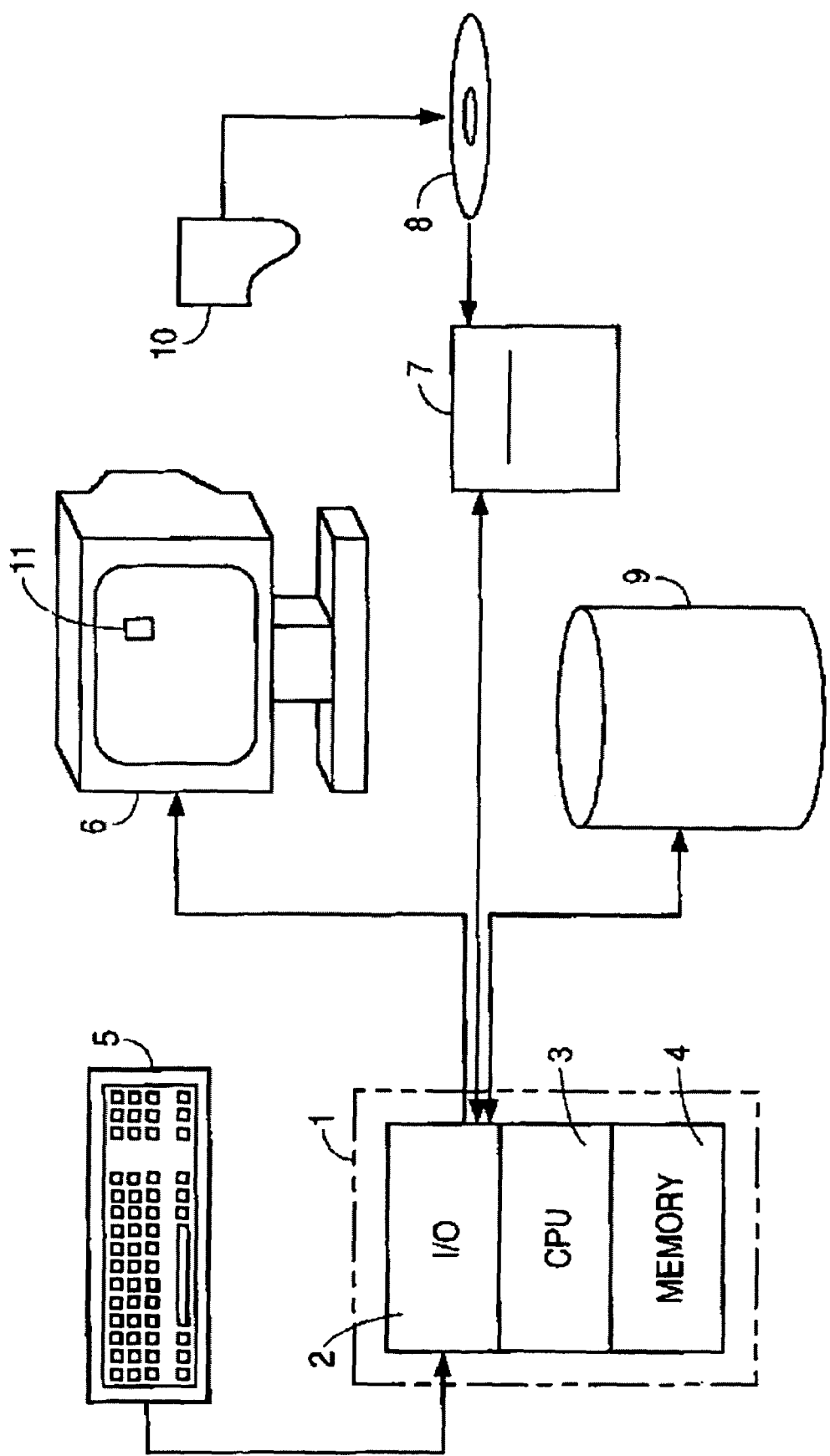
FIG. 1 illustrates a portion of a computer, including a CPU and conventional memory in which the presentation may be embodied.

The environment in which the present invention is used encompasses the general distributed computing system, wherein general-purpose computers, workstations, or personal computers are connected via communication links of various types, in a client-server arrangement, wherein programs and data, many in the form of objects, are made available by various members of the system for execution and access by other members of the system. Some of the elements of a general-purpose computer are shown in FIG. 1, wherein a computing system 1 is shown, having an Input/output ("I/O") section 2, a microprocessor or central processing unit ("CPU") 3, and a memory section 4. The I/O section 2 is connected to a keyboard and/or other input devices 5, a display unit and/or other output devices 6, one or more fixed storage units 9 and/or removable storage units 7. The removable storage unit 7 can read a data storage medium 8 which typically contains programs 10 and other data.

Figure 2:
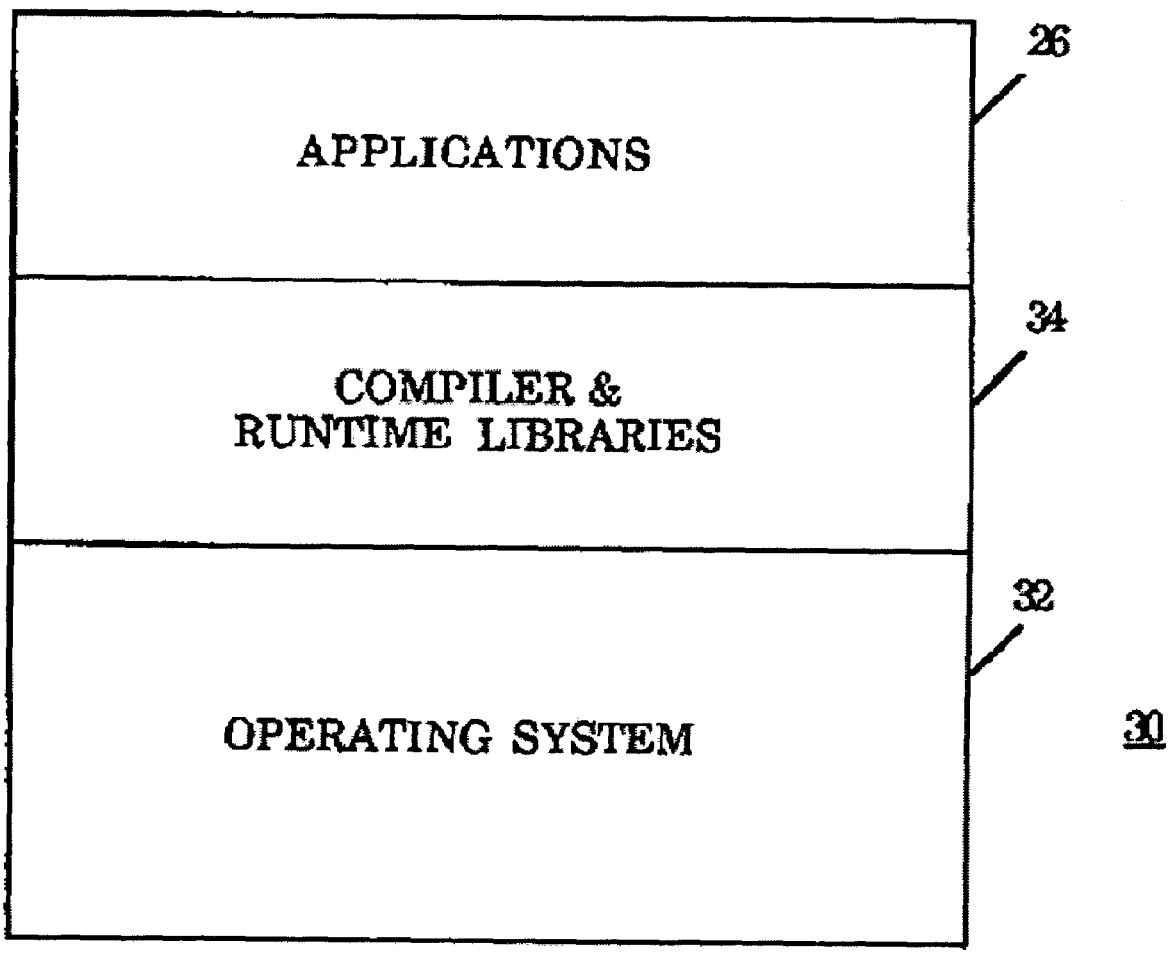
FIG. 2 illustrates example software elements of the illustrative computer system of FIG. 1.

FIG. 2 illustrates example software elements of the illustrative computer system of FIG. 1. Shown are application programs 26. Such applications 26 may be compiled using a compiler 34 incorporated with the teachings of the present invention. The compiled application programs 26 access the runtime libraries 34 for services during execution,which in turn access the operating system 32 for system services. The compiler 34 also accesses the operating system 32 for system services during compilation of application programs 26.

A compiler 34 incorporating the teachings of the present invention may comprise either a native compiler running on the target microprocessor system, or a cross compiler running on a different microprocessor system. In accordance with an embodiment of the invention, the target microprocessor for the compiler has multiple functional units of the same type. For example, the microprocessor may comprise one with a superscalar architecture.

Figure 3A:
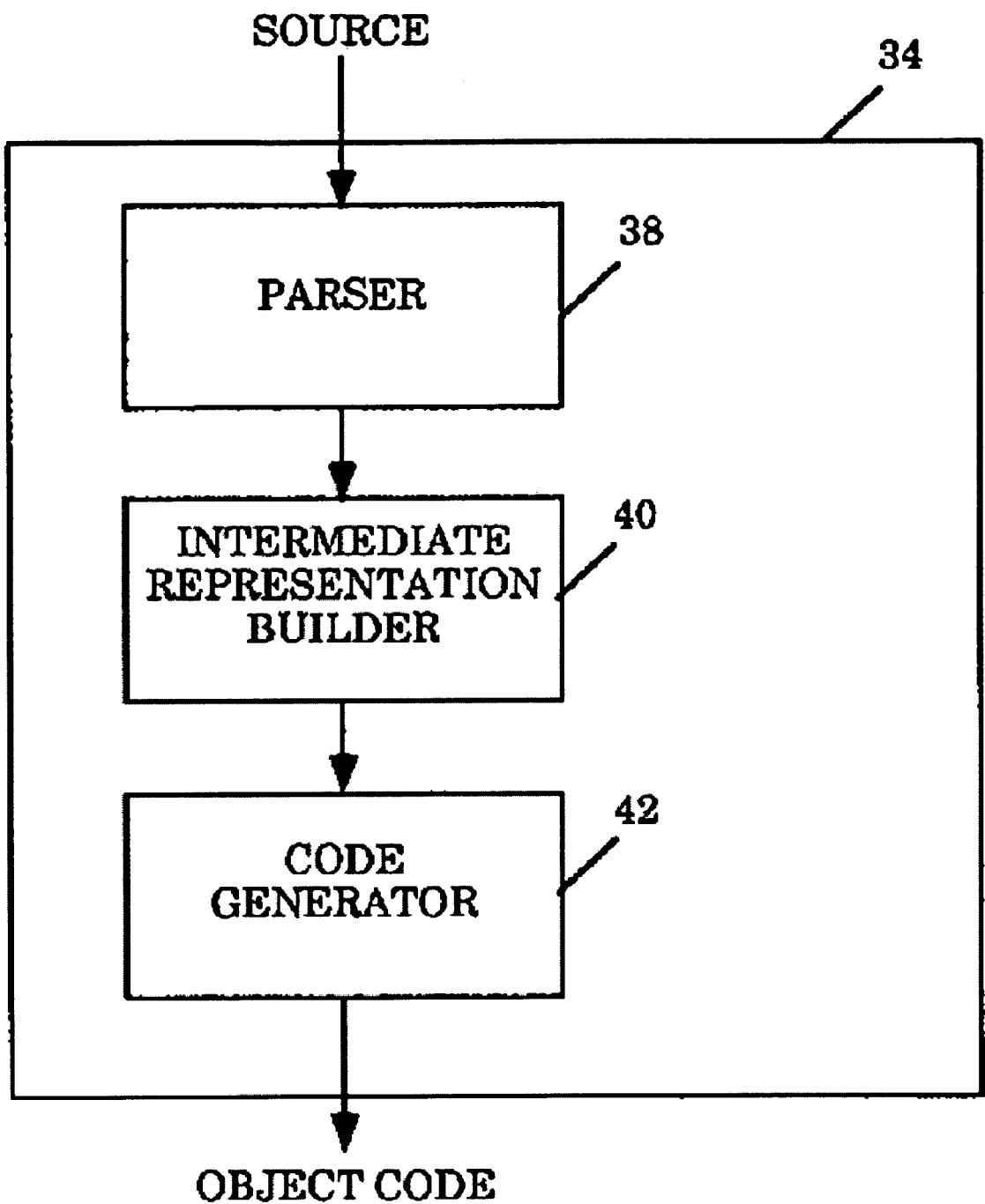
FIG. 3*a* is a block diagram illustrating components of a compiler in one example.
Figure 3B:
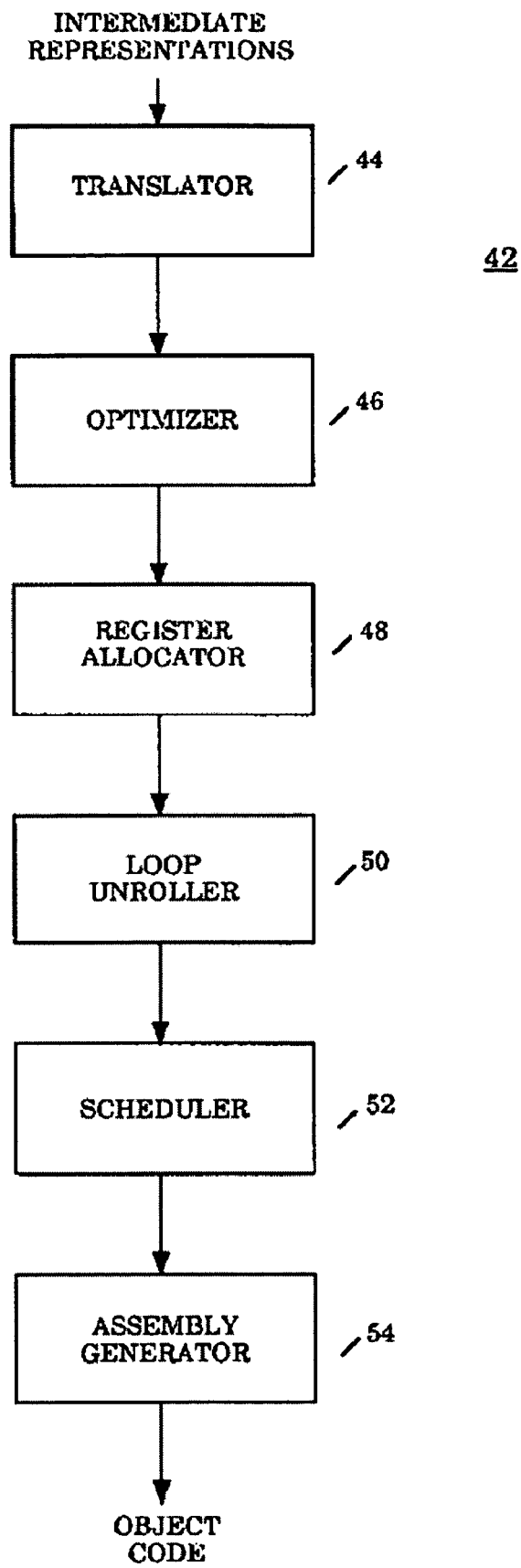
FIG. 3*b* is a block diagram illustrating components of a code generator in one example.

Referring now to FIGS. 3*a* and 3*b*, these block diagrams illustrate one embodiment of a compiler. As illustrated in FIG. 3*a*, in this embodiment, the compiler 34 comprises a parser 38, an intermediate representation builder 40, and a code generator 42 incorporated with the teachings of the present invention. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. The compiler 34 may be configured differently in accordance with other embodiments.

As illustrated in FIG. 3b, in this embodiment, the code generator 42 is configured to include a translator 44, an optimizer 46, a register allocator 48, a loop unroller 50, a scheduler 52, and an assembly code generator 54. The translator 44 receives the intermediate representations as inputs. In response, the translator 44 builds the loop table, orders instruction blocks, constructs data flow graphs etc. The optimizer 46 receives the intermediate representations and associated information as inputs, including the loop table and the data flow graph. In response, it performs various optimizations. The register allocator 48 receives the optimized intermediate representations and associated information as inputs. In response, it allocates registers of the target microprocessor to the instructions being generated. The loop unroller 50 receives the optimized intermediate representations with allocated registers and associated information as inputs. In response, it restructures the instructions being generated, unrolling loops in the instructions being generated for an optimal amount of time consistent with the resources available in the target microprocessor. The scheduler 52 receives the restructured intermediate representations and associated information as inputs. In response, it further restructures the instructions to be generated for parallelism. Lastly, the assembly code generator 54 receives the optimized, register allocated, and restructured intermediate representations and associated information as inputs. In response, it generates the object code for the program being compiled. The code generator 42 may be configured differently in accordance with other embodiments.

While for ease of understanding, the code generator 42 is being described with the above described embodiment which allocates registers before unrolling the loops in the instructions being generated and scheduling instructions for parallelism, based on the descriptions to follow, it will be appreciated that the present invention may be practiced with other register allocation, loop unrolling and scheduling approaches having different register allocation, loop unrolling and scheduling order.

Figure 4:
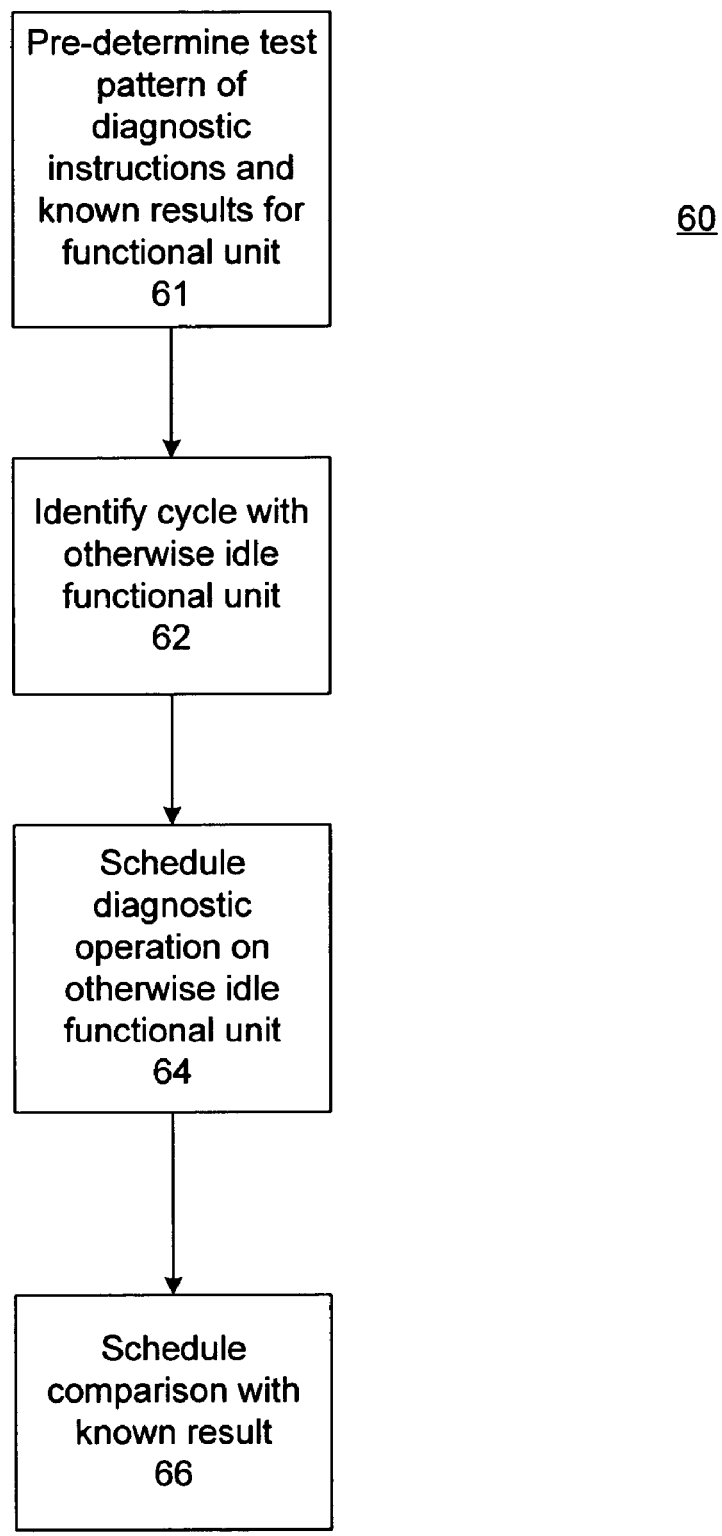
FIG. 4 is a flow chart depicting steps relating to scheduling instructions by a compiler in accordance with an embodiment of the invention.

FIG. 4 is a flow chart depicting steps relating to scheduling instructions by a compiler in accordance with an embodiment of the invention. The method of FIG. 4 may be utilized in a microprocessor or central processing unit (CPU) with multiple functional units of the same type. For example, the CPU may have multiple arithmetic logic units (ALUs) or multiple floating point units (FPUs).

Per the method 60 of FIG. 4, a preliminary step involves predetermination of a test pattern 61 for a functional unit. The test pattern may comprise, for example, a series of diagnostic instructions and corresponding known results. Preferably, the test pattern is chosen so as to provide an effective test as to the proper operation of the functional unit.

Conventionally, it is a function of the compiler scheduler to keep all of these units as busy as possible. Nevertheless, there will be cycles when a unit will be idle or perform a no-op (no operation). In accordance with an embodiment of the invention, identification 62 is made of such a cycle in which a functional unit would be idle. Instead of letting the unit be idle, the compiler schedules 64 a diagnostic operation into that idle unit to provide opportunistic fault checking of the function. The diagnostic operation may be selected from the series of diagnostic operations in the predetermined test pattern. A comparison of the results from the execution of the diagnostic operation on that functional unit with the corresponding predetermined (known) result would be scheduled 66 for fault checking purposes. If the results of the comparison 66 indicate a difference from the predetermined result, then an error has occurred and may be flagged by the CPU.

For example, consider a CPU with two floating point units, FP_A and FP_B. Most of the time, both units may be scheduled to operate on independent data. However, the compiler may be able to schedule an operation for FP_A for a given cycle, but there may not be another operation available for scheduling on FP_B for that cycle. In accordance with an embodiment of the invention, the compiler would identify 62 this opportunity and schedule 64 the diagnostic operation to be executed on FP_B. In addition, the compiler would schedule 66 a compare operation to compare the results of the operation with the corresponding predetermined (known) result. While this example cites floating point units, the principle is applicable to any processor resource of which there are multiple copies that are scheduled by the compiler.

The comparison operation may have some impact on performance. To ameliorate this, in accordance with one embodiment, the compiler may be configured to have user selectable levels of aggressiveness with respect to how often to utilize idle cycles for this purpose. For example, the level of aggressiveness may be set using a programmable 'slider', perhaps with a 0 to 10 scale of aggressiveness. On the less aggressive end of the sliding scale, the compiler may be set so that none of the idle cycles are used for fault checking. Higher on the aggressiveness scale, the compiler may be set to always utilize idle cycles. Yet higher on the aggressiveness scale, the compiler may be set to utilize even non-idle cycles (i.e. force operations on a functional unit to be performed redundantly on another functional unit). Hence, the compiler can be configurable to sacrifice performance for fault tolerance if so desired by the program creator.

In addition, once an error is flagged, there are a variety of ways to deal with the error depending on the level of fault tolerance and performance desired. In accordance with one embodiment, since it is not yet known which functional unit had the error, a possible action would be to halt the CPU and flag the user about the problem. In that embodiment, further diagnostics may be run offline. In other embodiments, more sophisticated algorithms may be utilized that would attempt actual recovery without operating system or application interruption.

Figure 5:
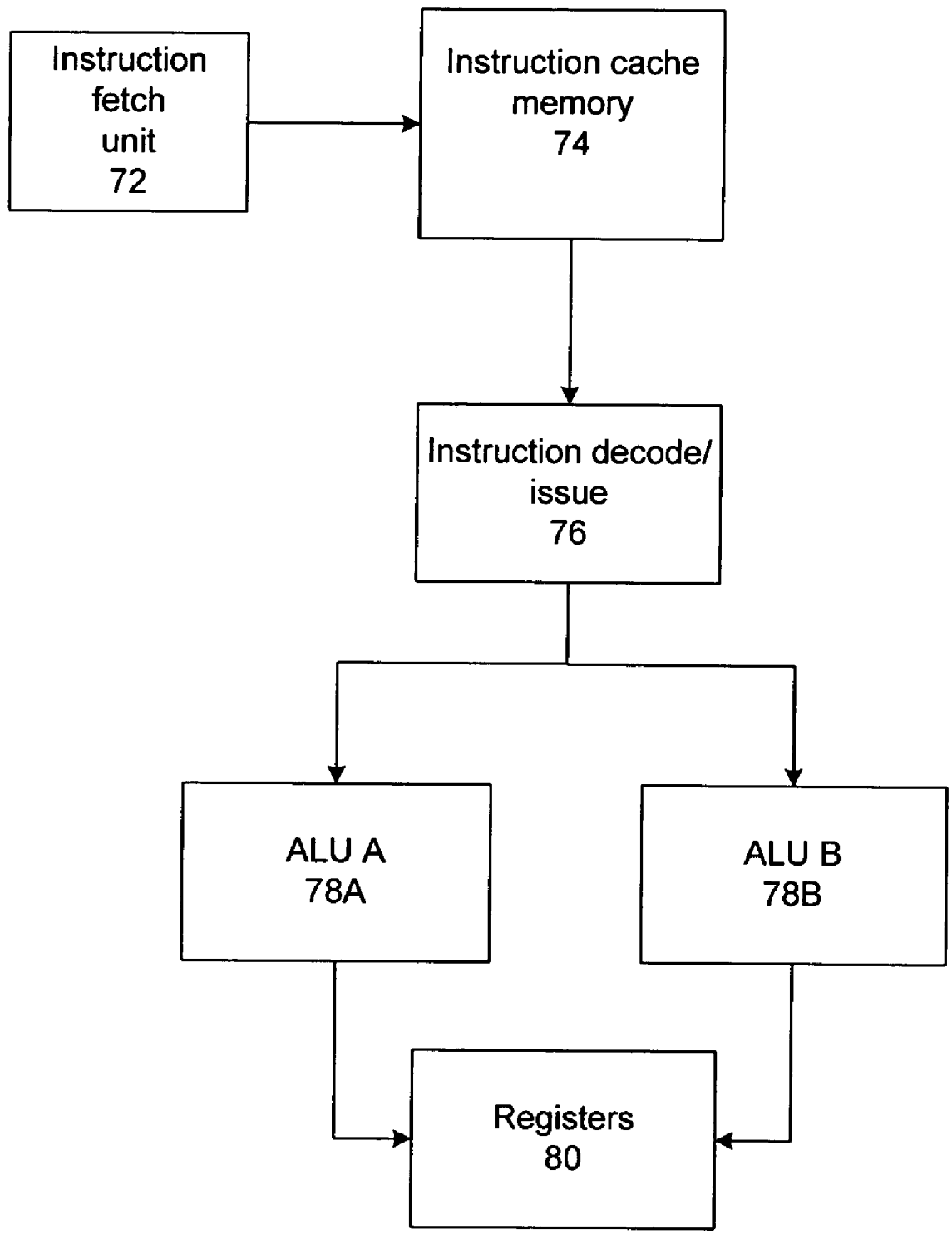
FIG. 5 is a block diagram illustrating select components of a microprocessor with multiple arithmetic logic units in one example.

FIG. 5 is a block diagram illustrating select components of a microprocessor with multiple arithmetic logic units in one example. An actual microprocessor will, of course, have numerous other components that are not illustrated. The components illustrated for explanatory purposes include an instruction fetch unit 72, an instruction cache memory 74, instruction decode/issue circuitry 76, multiple arithmetic logic units (ALUs) 78, and registers 80. The configuration of these components in FIG. 5 is just one example configuration. While the configuration illustrated has two ALUs 78, embodiments of the invention may also be implemented on microprocessors with just one ALU or more than two ALUs.

The instruction cache 74 stores instructions that are frequently being executed. Similarly, a data cache (not illustrated) may store data that is frequently being accessed to execute the instructions. In some implementations, the instruction and data caches may be combined into one memory. There is also typically access (not illustrated) to dynamic random access memory (DRAM), disk drives, and other forms of mass storage.

Addresses of instructions and memory may be generated by circuitry in the instruction fetch unit 72. For example, the fetch unit 72 may be configured to include a program counter that increments from a starting address within the instruction cache 74 serially through successive addresses in order to serially read out successive instructions stored at those addresses. The instruction decode/issue circuitry 76 receives instructions from the cache 74, and decodes and/or issues them to the ALUs 78 for execution. For example, two separate instructions may be decoded and issued, one to each of two ALUs 78A and 78B, for execution in a particular cycle. The ALUs 78 may be configured to output the results of the execution to specific registers 80 in the microprocessor. Other circuitry, such as that to supply operands for the instruction execution, is not illustrated.

In accordance with an embodiment of the invention, the circuitry of FIG. 5 may be utilized to take advantage of opportunities presented, for example, of a cycle when only one instruction needs to be executed by the two ALUs 78A and 78B. In that situation, the compiler may identify 62 this opportunity, schedule 64 a diagnostic instruction to be executed on the otherwise idle ALUs. The diagnostic operation may be selected from the series of diagnostic operations in a predetermined test pattern. The compiler also schedules 66 a subsequent comparison of the result from that ALU to the corresponding predetermined (known) result. Thus, fault checking is provided for that ALU in a way that opportunistically takes advantage of an otherwise idle cycle for that unit.

For instance, suppose a cycle is identified 62 when ALU_A would be otherwise idle. The compiler would then schedule 64 a diagnostic operation. As a simplified example, let the diagnostic operation be to add the operand 2 to the operand 3 (i.e. to calculate 2+3). The compiler would schedule 64 the operation to calculate 2+3 for ALU_A during that cycle. The result of the calculation would be stored in a register in the CPU. The compiler would also schedule 66 a compare of the calculated result with the known result of 5. If the compare is good (i.e. the results are the same), then ALU_A passes that diagnostic operation. If the compare fails (i.e. the results are different), then ALU_A failed that diagnostic operation and an error would be flagged. Of course, the operation "2+3" is overly simplistic and just used for illustrative purposes. The actual diagnostic operations would be chosen to stress the execution unit so as to provide an effective test of its operational status.

Figure 6:
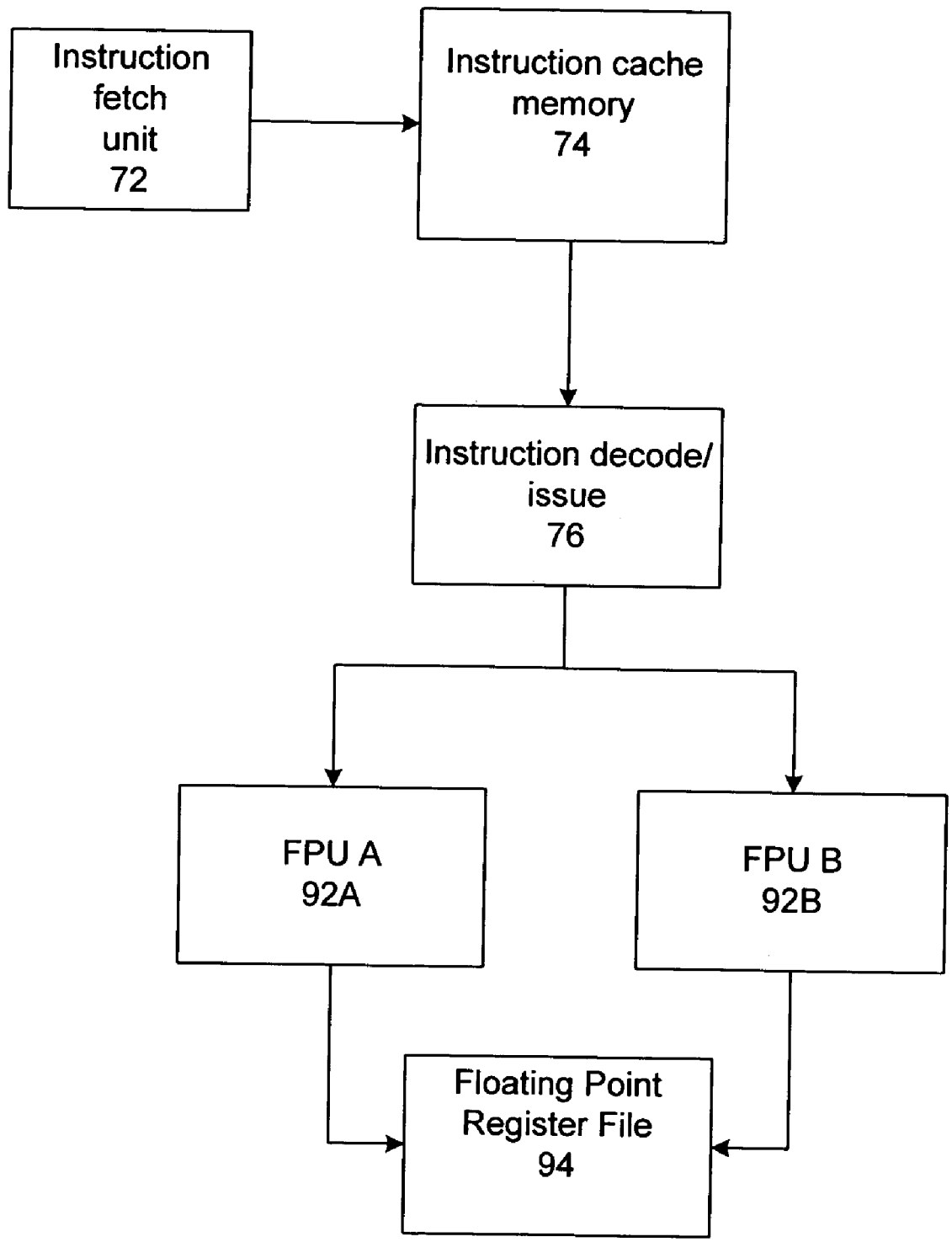
FIG. 6 is a block diagram illustrating select components of a microprocessor with multiple floating point units in one example.

FIG. 6 is a block diagram illustrating select components of a microprocessor with multiple floating point units in one example. An actual microprocessor will, of course, have numerous other components that are not illustrated. The components illustrated for explanatory purposes include an instruction fetch unit 72, an instruction cache memory 74, instruction decode/issue circuitry 76, multiple floating point units (FPUs) 92, and a floating point register file 94. The configuration of these components in FIG. 6 is just one example configuration. While the configuration illustrated has two FPUs 78, embodiments of the invention may also be implemented on microprocessors with just one FPU or more than two FPUs.

The fetch unit 72, instruction cache 74, and the decode/issue unit 76 has the same or similar functionality as described above in relation to FIG. 5. In this instance, the instruction decode/issue circuitry 76 receives floating point type instructions from the cache 74, and decodes and/or issues them to the FPUs 92 for execution. For example, two separate floating point instructions may be decoded and issued, one to each of two FPUs 92A and 92B, for execution in a particular cycle. The FPUs 92 may be configured to output the results of the execution to specific floating point registers 94 in the microprocessor. Other circuitry, such as that to supply operands for the floating point operation execution, is not illustrated.

In accordance with an embodiment of the invention, the circuitry of FIG. 6 may be utilized to take advantage of opportunities presented, for example, of a cycle when only one floating point instruction needs to be executed by the two FPUs 92A and 92B. In that situation, the compiler may identify 62 this opportunity, schedule 64 a diagnostic instruction to be executed on the otherwise idle FPUs. The diagnostic operation may be selected from the series of diagnostic operations in a predetermined test pattern. The compiler also schedule 66 a subsequent comparison of the result from that FPU to the corresponding predetermined (known) result. Thus, fault checking is provided for that FPU in a way that opportunistically takes advantage of an otherwise idle cycle for that unit.

While the above examples discuss configurations with two functional units of the same type, other embodiments of the invention may utilize a target microprocessor with just one functional unit of the same type or with more than two functional units of the same type. If there is only one functional unit of a particular type, an otherwise idle cycle may still be identified for that unit, and a diagnostic operation may be opportunistically be scheduled during that otherwise idle cycle for fault checking purposes. Similarly, if there are four functional units of the same type, and there are only two instructions to be issued to these four units during a cycle, then the otherwise idle two units may be opportunistically scheduled to execute diagnostic operations for fault checking purposes.

Furthermore, while FIGS. 5 and 6 fault checking of ALUs and FPUs, embodiments of the present invention may be utilize other types of functional units as well. These functional units may also comprise resources that may be scheduled by a compiler to take opportunistic advantage of idle cycles to perform fault checking.

An embodiment of the invention exploits the fact that latent CPU defects tend to be predictable in advance, as execution units tend to "weaken" over time. Advantageously, a level of fault tolerance for the CPU is achieved with little performance impact because idle or no-op cycles are utilized through intelligent compiler scheduling to conduct the functional testing.

An embodiment of the invention achieves a level of fault tolerance for a CPU without requiring extra hardware circuitry be designed into the CPU. Instead, the fault tolerance is provided by software modification to the compiler. Furthermore, the use of known data patterns reduces the performance overhead because the calculated result is compared to a known result that may be pre-calculated at compile time.

A compiler providing fault checking in accordance with an embodiment of the invention is not limited to a particular CPU architecture. A compiler for any appropriate CPU may be so modified, provided that the CPU has multiple functional units of the same type that may be scheduled in accordance with an embodiment of the invention.

An embodiment of the present invention makes fault tolerant features available on lower-end systems. Previously, such fault tolerant features may have been unavailable on such lower-end systems due to their cost-sensitive nature.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of compiling a program to be executed on a target microprocessor, the method comprising:
    identifying, while compiling the program, a cycle during which a functional unit in the microprocessor would otherwise be idle;
    opportunistically scheduling, during compilation of the program, a diagnostic operation for execution on the functional unit during said identified cycle; and
    scheduling, during compilation of the program, a comparison of a result from executing the diagnostic operation with a corresponding predetermined result.

2. The method of claim 1, further comprising:
    predetermining a test pattern of diagnostic operations and corresponding predetermined results for the functional unit.

3. The method of claim 1, further comprising:
    causing a flag in the target microprocessor to be set when the comparison indicates an error.

4. The method of claim 3, further comprising:
    if the error flag is set, then halting the execution and causing a notification to a user of the error flag.

5. The method of claim 1, further comprising:
    setting a user-selectable level ('slider') for an aggressiveness of said opportunistic scheduling.

6. The method of claim 1, wherein the functional unit comprises a floating point unit.

7. The method of claim 1, wherein the functional unit comprises an arithmetic logic unit.

8. The method of claim 1, wherein the functional unit comprises one of multiple functional units of a same type within the target microprocessor.

9. The method of claim 1, wherein the method is performed by a scheduler in a code generator of a program compiler.

10. The method of claim 9, wherein the program compiler comprises a native compiler for the target microprocessor.

11. The method of claim 9, wherein the program compiler comprises a cross compiler run on a different microprocessor.

12. A program compiler stored on a computer-readable medium for use with a target microprocessor, the compiler comprising a code generator including a scheduler that identifies a cycle during which a functional unit would otherwise be idle, opportunistically schedules a diagnostic operation to be executed on the functional unit during that cycle, and schedules a comparison of a result from executing the diagnostic operation with a corresponding predetermined result, wherein the functional unit comprises one of multiple functional units of a same type within the target microprocessor.

13. A program compiler stored on a computer-readable medium for use with a target microprocessor, the compiler comprising a code generator including a scheduler that identifies a cycle during which a functional unit would otherwise be idle, opportunistically schedules a diagnostic operation to be executed on the functional unit during that cycle, and schedules a comparison of a result from executing the diagnostic operation with a corresponding predetermined result, wherein the scheduler selects the diagnostic operation from a test pattern of diagnostic operations.

* * * * *